March 11, 1969     R. NEUSCHOTZ     3,431,960
THREADED FASTENER WITH DEFORMABLE ANCHORING PORTION
Filed Oct. 10, 1966
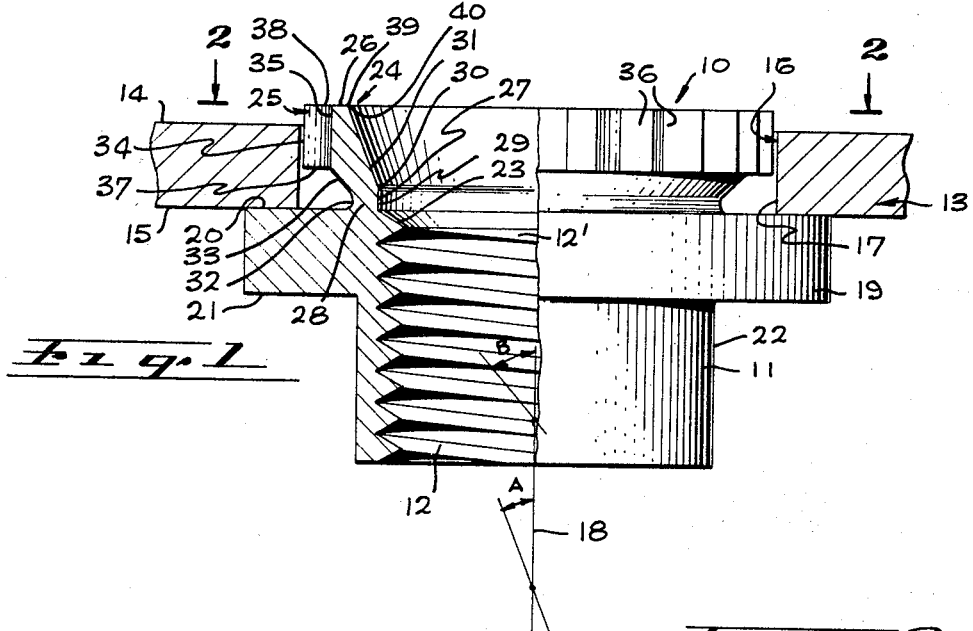
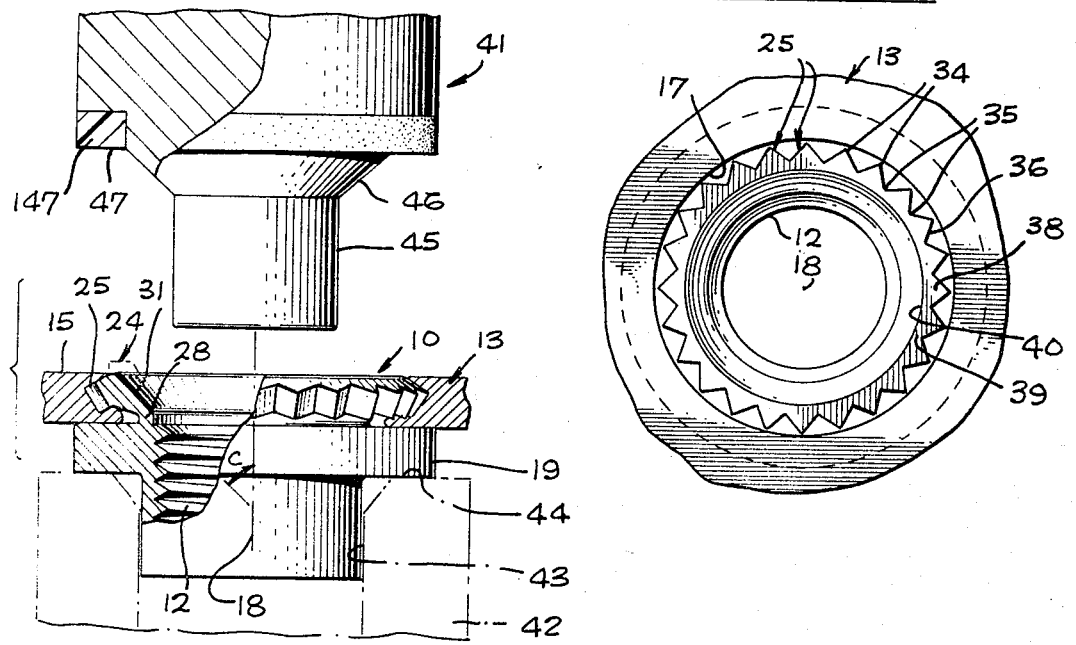
ROBERT NEUSCHOTZ
INVENTOR.
BY William P. Green
ATTORNEY

United States Patent Office 3,431,960
Patented Mar. 11, 1969

3,431,960
THREADED FASTENER WITH DEFORMABLE ANCHORING PORTION
Robert Neuschotz, 1162 Angelo Drive,
Beverly Hills, Calif. 90210
Filed Oct. 10, 1966, Ser. No. 585,615
U.S. Cl. 151—41.72    9 Claims
Int. Cl. F16b 39/28

ABSTRACT OF THE DISCLOSURE

A threaded element having a flange engageable with a carrier part about an opening, and having a smaller diameter anchoring portion adapted to project into the opening and terminating at an edge carrying serrations which are deformable radially outwardly and axially toward the flange and into locking engagement with the material of the carrier part about the opening. The anchoring portion has radially inner and outer surfaces both of which flare to increased diameters as they advance axially beyond the flange, and which preferably flare at different angles so that the anchoring portion progressively increases in thickness beyond a reduced diameter axially extending bending portion near the flange.

Cross reference to related application

Certain features of the devices shown in this application have been disclosed and claim previously in my prior co-pending application Ser. No. 524,085, filed Feb. 1, 1966, on "Structure and Installation of Threaded Elements Having Serrated Locking Portion."

This invention relates to an improved threaded element of a type adapted to be anchored within an opening in a carrier part, such as for instance a body of sheet metal or the like, to enable connection of a screw or other fastener to the carrier part through the medium of the anchored threaded element.

A fastener embodying the invention is of a type having a flange adapted to bear axially against an inner surface of a sheet or other carrier part, at a location about an opening in the carrier part, and also having a generally tubular locking portion projecting axially beyond the flange and of a diameter less than that of the flange, to be received within the opening in the carrier part. This anchoring or locking portion carries radially outwardly projecting serrations at or near the axially outer extremity of the fastener, and is adapted to be deformed or expanded radially outwardly against the material of the carrier part in a manner securely attaching the fastener to the carrier part. This deformation also deflects the serrations axially toward the flange of the device, at the same time that the serrations move radially outwardly, to thus attain an optimum locking action in very simple fashion.

A major object of the invention is to provide improvements in the configuration of the anchoring portion of a fastener of the above defined type, directed toward an increase in the effectiveness with which the fastener is secured to the carrier part, and is retained against both turning movement relative to, and axial separation from, the carrier part. For this purpose, I preferably so form the anchoring portion as to have a side wall which presents a thin bending area near the flange of the device, and which increases in wall thickness as it advances toward the location of the serrations, to thus tend to localize a substantial portion of the bending of the side wall at the mentioned thin area, while at the same time assuring adequate strength of the anchoring portion near the serrations to hold the serrations in their expanded locking positions. Desirably, the side wall of the anchoring portion is defined by radially inner and outer surfaces both of which flare radially outwardly away from the axis of the device as they advance toward the serrations, and which also diverge away from one another in advancing toward the serrations to attain the discussed increase in thickness of the side wall of the anchoring portion.

To assist in maintaining the device against axial separation from the carrier part, I find it desirable to form the serrations in a manner presenting end surfaces of the serrations which face axially toward the flange and are disposed approximately directly transversely of the axis of the threads. A similar transverse surface should desirably be provided on the anchoring portion at the opposite end of the serrations.

The above and other features and objects of the invention will be better understood from the following detailed description of the typical embodiment illustrated in the accompanying drawing, in which:

FIG. 1 is a partly elevational and partly axial sectional view of a plate nut constructed in accordance with the invention, shown prior to locking deformation of its anchoring portion;

FIG. 2 is an end view taken on line 2—2 of FIG. 1;

FIG. 3 is a view similar to FIG. 1, but showing the device after expansion of its locking portion against the carrier part.

The plate nut 10 illustrated in FIG. 1 includes an essentially tubular body 11 formed of an appropriate essentially rigid material, such as a suitable steel, and containing internal threads 12 into which a mating screw is connectible to secure the screw to a carrier part 13 through the medium of nut 10. This carrier part may take the form of a piece of sheet metal, having parallel planar inner and outer surfaces 14 and 15, and containing a circular opening 16 with a straight cylindrical side wall surface 17 centered about an axis 18 which extends perpendicular to surfaces 14 and 15 of the carrier part.

Externally, body 11 of the nut or fastener 10 has an annular radially outwardly projecting flange portion 19, defined at its opposite axial sides by two annular surfaces 20 and 21 disposed transversely of axis 18. The flange is of a diameter substantially greater than the diameter of opening 16, to engage upwardly or axially outwardly against inner surface 14 of the carrier part about the opening. Also, as will be apparent from the figures, flange 19 and threads 12, as well as the other later-to-be-described portions of nut 10, are all centered about the mentioned axis 18, which in the FIG. 1 position of the nut constitutes the axis of both the nut and opening 16.

Beneath or axially inwardly of flange 19, body 11 may have an outer cylindrical surface 22 of reduced diameter, defining a tubular portion of body 11 which contains the major portion of the threads 12. These threads desirably continue upwardly beyond the upper extremity of surface 22, to form portions of the threads at 12' within the interior of flange 19. The outer extremity of the threads may be chamfered annularly at 23, with the chamfer terminating upwardly in approximately the transverse plane of surface 20 of the flange.

Upwardly or axially outwardly beyond the plane of flange surface 20, body 11 of the nut integrally carries and forms an anchoring portion 24 for fastening the nut to carrier part 13. This anchoring portion flares to an increased diameter as it advances axially away from flange 19, and carries a series of circularly spaced radially outwardly facing and projecting serrations 25 at the free end or extremity 26 of the anchoring portion. The opposite end 27 of the generally tubular anchoring portion 24 merges integrally with the remainder of body 11 at the location of flange 19. At this end 27 of the anchoring portion, the side wall of that portion has an area 28 which is relatively thin radially, to define a bending location at which the major portion of the bending of the locking portion occurs when the device is deformed into locking engagement with the carrier part. The anchoring portion 24 preferably increases in radial thickness as it advances from the end or location 27 toward serrations 25 and the opposite end 26 of the anchoring portion.

To describe the illustrated preferred configuration of anchoring portion 24 more specifically, it is noted that internally this portion of the device may have a first short axially extending cylindrical surface 29 centered about axis 18 and extending axially from the plane of flange surface 20 to a location 30. Beyond that location, the anchoring portion has an inner surface 31 which flares progressively radially outwardly as it advances axially, and is desirably frusto-conical in shape.

Radially opposite inner surface 29, anchoring portion 24 has a radially outer surface 32 which extends generally axially, to form with surface 29 the reduced dimension bending area 28. Surface 32 is typically curved arcuately in axial section, as shown, and merges with surface 20 of the flange, and with an external surface 33 of the locking portion which flares progressively outwardly as it advances axially away from the flange and toward serrations 25. The desired increase in thickness of anchoring portion 24 as it advances from reduced thickness area 28 toward the serrations is attained by designing surface 33 to flare at an angle B with respect to axis 18 which is greater than the angle of flare A of surface 31 with respect to that axis.

The serrations 25 may have the transverse cross sectional configuration illustrated in FIG. 2, and may extend directly axially so that this same cross sectional shape continues without change along the entire axial extent of the serrations. Thus, each serration has a radially outer maximum diameter peak 34 which extends parallel to axis 18 at a diameter only slightly less than the diameter of surface 17 which defines opening 16 of the carrier part. The minimum diameter or valley portions 35 of the serrations also may extend directly axially, as do the planar side faces 36 of the serrations.

At their axially inner ends, the serrations 25 have end faces 37 which are disposed more directly transversely of axis 18 than is the adjacent flaring surface 33 of the anchoring portion. Preferably, surfaces 37 are disposed approximately directly transversely of axis 18, and for best results exactly transversely of that axis and therefore parallel to surface 20 of the flange. Similarly, the opposite ends of the serrations desirably have end faces 38 which are directed axially away from flange 19, and which are disposed approximately directly transversely of axis 18, and for best results exactly transversely of that axis. Surfaces 38 continue radially inwardly beyond the minor diameter of serrations 25, to form an annular similarly transverse end face 39 on the anchoring portion of the device, which surface 39 meets flaring surface 31 at an annular edge 40.

To install the nut 10 within plate or carrier 13, the first step is to insert anchoring portion 24 of the nut into opening 16 to the FIG. 1 position, following which a tool such as that shown at 41 in FIG. 3 is pressed downwardly or axially against anchoring portion 24, while the nut is retained against axial movement out of opening 16 by engagement with a circular backing member represented at 42. This backing member may contain a cylindrical recess 43 into which the nut projects, so that the member may engage flange 19 of the nut at 44 about the recess. Tool 41 has a cylindrical pilot portion 45 which projects into and is centered within threads 12 of the nut. At the upper extremity of this pilot portion, the tool has an annular tapering frusto-conical surface 46 which engages anchoring portion 24 and bends it from the FIG. 1 position to the FIG. 3 position. This deforming action is limited by engagement of an annular surface 47 of a ring 147 with outer surface 15 of the carrier part, desirably with sufficient force being applied to deform serrations 25 inwardly beyond the plane of surface 15. Ring 47 may be essentially rigid but be formed of a very slightly deformable material such as nylon to slightly cushion the tool impact.

Deforming surface 46 may initially engage the anchoring portion of the nut at the corner 40, to expand serrations 25 radially outwardly into biting engagement with the material of the carrier part, while at the same time bending the anchoring portion 24 and serrations axially toward flange 19, as will be apparent from FIG. 3. A substantial portion of the bending action occurs at the narrow area 28 of the anchoring portion. At the conclusion of the deforming action, surfaces 37 of the serrations may be disposed at an oblique angle to axis 18 (see FIG. 3) by virtue of the outward bending and swinging action of the anchoring portion, and surface 31 of the anchoring portion may be disposed at an increased angle C with respect to axis 18, corresponding to the angularity of surface 46.

After anchoring portion 24 has been deformed to the FIG. 3 condition, serrations 25 very effectively retain the nut against either rotary or axial displacement relative to the carrier part. The increased thickness of the anchoring portion near and at the location of serrations 25 assures sufficient strength in this portion of the device to prevent inward collapse of the serrations in response to the imposition of load forces on the device, while the reduced thickness of the anchoring portion at 28 facilitates controlled and proper bending of the anchoring portion. Also, the transverse disposition of end faces 37 of the serrations causes the development of a lock of maximum effectiveness against downward or axially inward movement of the nut relative to the carrier part. The transverse surfaces 38 and 39 at the opposite end of the serrations are desirable for the purpose of defining precisely the length of the anchoring portion relative to the thickness of the carrier part.

In using the nut after installation, a screw is advanced downwardly into the nut as shown in FIG. 3, and through anchoring portion 24 of the device into engagement with threads 12, to be screwed into those threads in a manner connecting the screw to the carrier part through the medium of nut 10. Flange 19 then acts to transmit the major axial forces from the nut to carrier part 13.

I claim:

1. An element to be secured to a carrier part containing an opening, comprising a body carrying threads to which a mating part may be connected, said body having a flange of a size larger than said opening adapted to bear axially against a surface of said carrier part about the opening, said body having a generally tubular circularly continuous anchoring portion smaller in diameter than said flange and projecting axially beyond the flange and small enough to be inserted axially into said opening, said anchoring portion having a first end connected to said flange and a second end spaced axially beyond the flange and at which said body terminates, said anchoring portion carrying near said second end thereof a series of radially outwardly projecting serrations which are of a diameter smaller than said flange to be insertible into the opening as the flange is moved into engagement with the carrier part about said opening, said anchoring portion being defined at its radially inner and outer sides by two essentially annular inner and outer surfaces, said anchoring portion being formed of a material which is deformable radially outwardly and also axially toward said flange in a relation forcing said serrations into the carrier part about said opening upon such deformation to lock the element non-rotatively in the opening, said essentially annular inner and outer surfaces of the anchoring portion extending approximately axially at a first area near said flange and then both flaring to increased diameters as they advance axially beyond said first area and toward the serrations, said inner and outer surfaces flaring at different angles beyond said first area to diverge away from one another and thereby progressively increase the wall thickness of said anchoring portion in advancing away from the flange.

2. An element as recited in claim 1, in which said inner surface continues to flare at a location directly radially inwardly of and opposite said serrations.

3. An element as recited in claim 2, in which said serrations have maximum diameter peaks at their radially outer extremities which extend substantially axially, and have circularly intermediate minimum diameter valleys which also extend substantially axially, said serrations having end surfaces at both ends thereof disposed approximately directly transversely of the axis of said threads, said threads being internal threads located partially within said flange and continuing axially beyond the flange in a direction away from said anchoring portion.

4. An element as recited in claim 1, in which said inner surface flares at an angle of between about 15 and 30 degrees to the axis of said threads, and said outer surface flares at an angle of between about 33 and 47 degrees to said axis.

5. An element to be secured to a carrier part containing an opening with a substantially cylindrical side wall, comprising a body carrying threads to which a mating part may be connected, said body having a flange of a size larger than said opening adapted to bear axially against a surface of said carrier part about the opening, said body having a generally tubular circularly continuous anchoring portion smaller in diameter than said flange and projecting axially beyond the flange and small enough to be inserted axially into said opening, said anchoring portion having a first end connected to said flange and a second end spaced axially beyond the flange and at which said body terminates, said anchoring portion carrying near said second end thereof a series of radially outwardly projecting serrations which are of a diameter smaller than said flange to be insertible into the opening as the flange is moved into engagement with the carrier part about said opening, said serrations tapering radially outwardly to maximum diameter peaks at their radially outer extremities which extend substantially directly axially and parallel to one another at locations spaced equal distances from the axis of said threads, to be received in close proximity to and center the anchoring portion within said cylindrical side wall of said opening in the carrier part, said serrations having minimum diameter generally axially extending valleys circularly intermediate said peaks, said anchoring portion being defined at its radially inner and outer sides by two essentially annular inner and outer surfaces having portions which extend approximately axially at a first area near said flange and then both flare progressively radially outwardly to increased diameters as they advance axially beyond said first area and toward the serrations, said anchoring portion being formed of a material which is deformable at essentially the location of said first area in a relation deflecting the serrations radially outwardly and also axially toward said flange and thereby forcing said serrations into the carrier part about said opening upon such deformation to lock the element non-rotatively in the opening.

6. An element as recited in claim 5, in which said generally tubular anchoring portion has a circularly continuous side wall which is relatively thin at said first area near said flange and increases in thickness in advancing axially beyond that area.

7. An element as recited in claim 5, in which said inner and outer surfaces flare at different angles to diverge away from one another and thereby progressively increase the wall thickness of said anchoring portion in advancing away from the flange.

8. An element as recited in claim 5, in which said serrations have end surfaces at both ends thereof disposed approximately directly transversely of the axis of said threads.

9. An element as recited in claim 5, in which said anchoring portion has at said second end thereof a surface extending substantially directly transversely of the axis of said threads and extending across and defining ends of said serrations and continuing radially inwardly a substantial distance beyond said serrations to said flaring annular inner surface of the anchoring portion, said anchoring portion having at the opposite end of said serrations a surface extending substantially directly transversely of said axis and extending across and defining said opposite ends of the serrations.

References Cited

UNITED STATES PATENTS

| | | | |
|---|---|---|---|
| 2,415,695 | 2/1947 | Kann | 151—41.72 |
| 2,444,145 | 6/1948 | Rosan | 151—41.73 |
| 3,198,874 | 8/1965 | Dahl | 151—41.73 |
| 3,204,679 | 9/1965 | Walsh | 151—41.72 |
| 3,280,874 | 10/1966 | Rosan | 151—41.72 |
| 2,255,964 | 9/1941 | Blaho | 29—522 |

FOREIGN PATENTS 665,765   1/1952   Great Britain.

MARION PARSONS, JR., Primary Examiner.

U.S. Cl. X.R.

29—432, 511, 522; 151—41.73